March 22, 1932.  F. H. SNYDER ET AL  1,850,732
PROCESS OF PURIFYING GASES
Filed Feb. 21, 1927  2 Sheets-Sheet 1
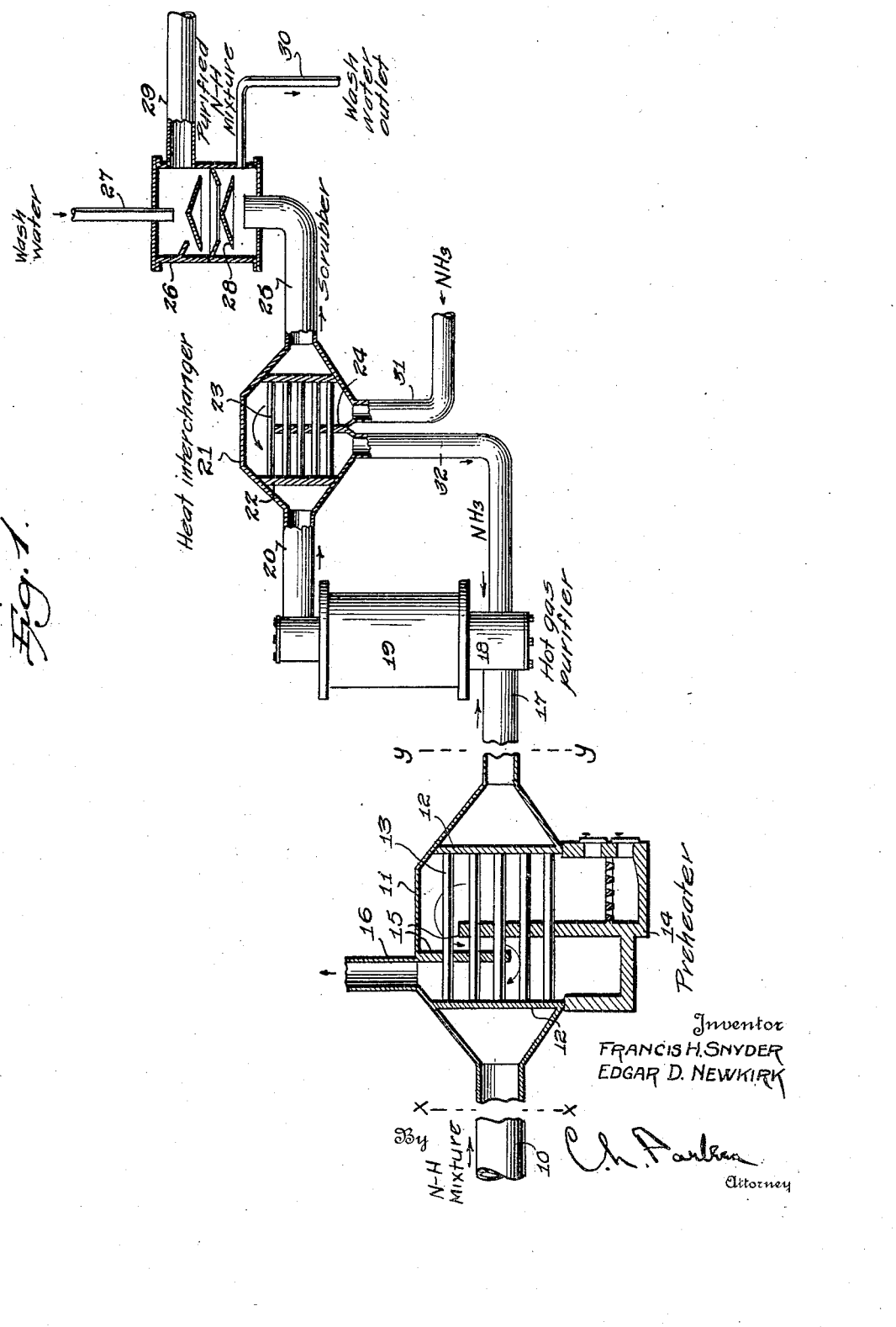
Inventor
FRANCIS H. SNYDER
EDGAR D. NEWKIRK
By
Attorney

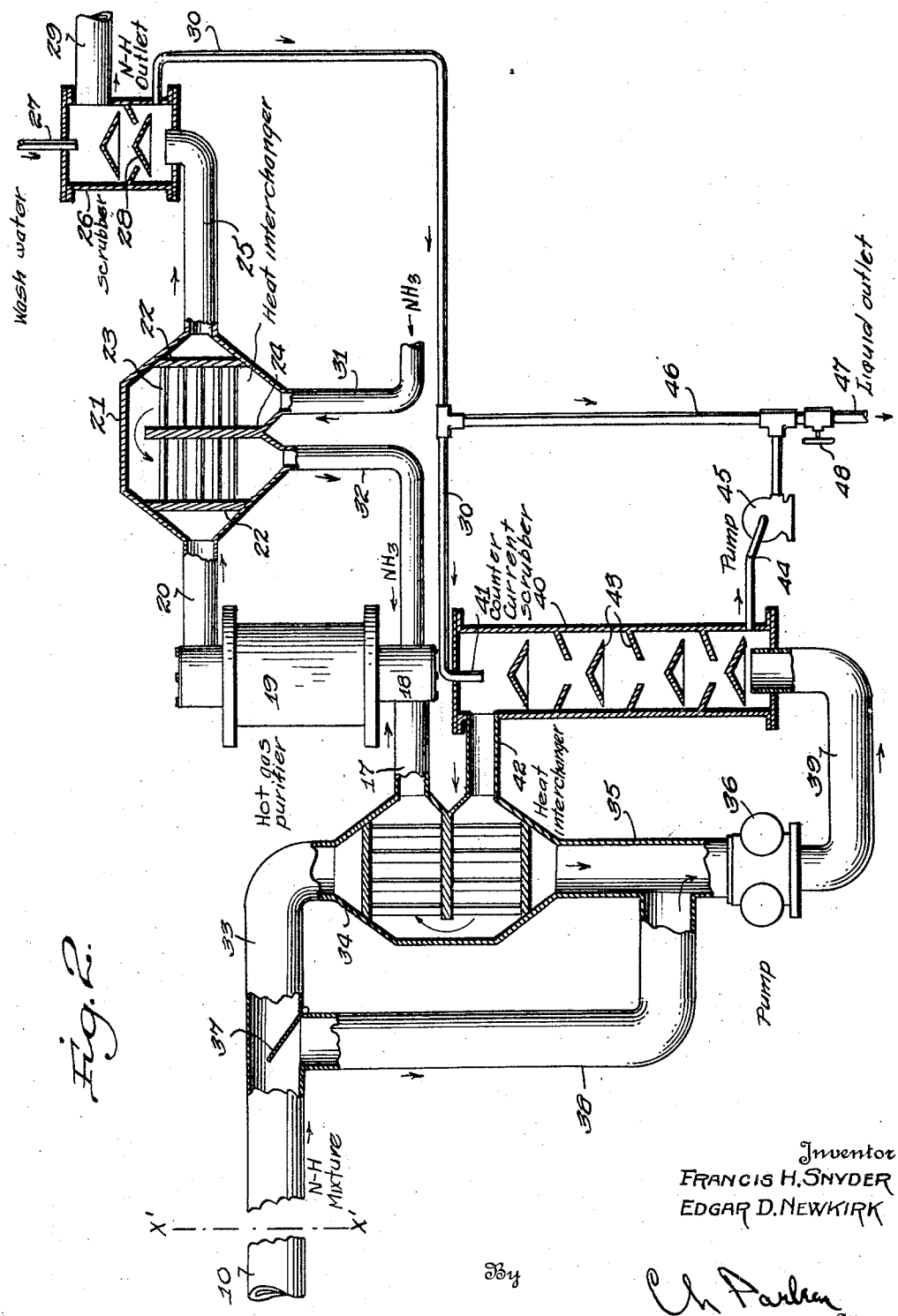

Patented Mar. 22, 1932

1,850,732

UNITED STATES PATENT OFFICE

FRANCIS H. SNYDER AND EDGAR D. NEWKIRK, OF SYRACUSE, NEW YORK

PROCESS OF PURIFYING GASES

Application filed February 21, 1927. Serial No. 170,024.

This invention relates to the purification of gases and mixtures of gases and in its preferred embodiment relates particularly to the purification of impure hydrogen for industrial uses.

An important object of this invention is to provide a simple, economical, and efficient process for purifying impure gases and gaseous mixtures.

Another object of this invention is to provide a simple, economical and efficient process for purifying impure commercial hydrogen.

A further object of this inventinon is to provide an efficient and economically practical process for purifying gaseous mixtures of hydrogen and nitrogen particularly for use in the production of nitrogen-bearing fertilizers and other commercial grades of ammonium salts.

A further object of this invention is to provide apparatus for efficiently carrying out the process above referred to.

Other objects and advantages of this invention will be apparent from the following description.

In the accompanying drawings we have shown in diagrammatic form the preferred construction of two modifications of apparatus suitable for carrying out our process. In this showing, Figure 1 illustrates a simplified form of apparatus for treating impure gases or mixtures of gases containing relatively small amounts of impurities which are readily soluble in aqueous ammonia, and Figure 2 illustrates a modified form of apparatus suitable for treating impure gases or mixtures of gases containing substantial amounts of impurities which are readily soluble in aqueous ammonia.

Referring to Figure 1 of the drawings the numeral 10 designates a gas inlet pipe which conducts the gas or gases to be treated from the source of supply of such gases into the gas preheater 11 which is of conventional construction and is provided with a pair of headers 12 secured to the outer casing of the preheater 11 and which are connected by tubes or pipes 13, which are adapted to conduct gases therethrough. Any suitable means may be provided for heating the tubes 13 to raise the temperature of the gases passing therethrough but we prefer to employ a furnace 14 arranged below the preheater 11 and adjacent the outlet end thereof and which is adapted to discharge the products of combustion therefrom into the preheater in contact with the tubes 13. The products of combustion from the furnace 14 are directed in a circuitous path as indicated by the arrow shown in Figure 1 by means of staggered baffle plates 15 and are discharged from the preheater through the stack 16. After passing through the tubes or pipes 13 the gas or gases to be treated are discharged from the preheater 11 into the pipe 17 through which they are conducted to the gas mixing chamber 18 of the hot gas purifier 19 which is a catalytic converter of any suitable conventional construction containing a catalyst of the character hereinafter described which is capable of effecting the reaction of carbon monoxid with ammonia.

For reasons hereinafter set forth, the gas or gases to be treated are preferably introduced into the gas mixing chamber 18 at a relatively high temperature and the preheater 11 serves to elevate the temperature of the gases when they are introduced at a relatively low temperature into the pipe 10. However, in the event that the gas or gases to be treated are at a sufficiently elevated temperature when introduced into the pipe 10 the preheater 11 is not employed and the pipe 10 indicated as broken away at the dotted line $xx$ is extended and directly connected to the pipe 17 at the point indicated by the dotted line $yy$ in the drawings.

The hot gas purifier 19 is provided with a gas discharge pipe 20 which is connected to a heat interchanger 21. The heat interchanger 21 is of usual construction and comprises an outer casing, a pair of headers 22 secured to the outer casing, pipes or tubes 23 connecting the headers in the manner of the usual tube boiler construction, and a baffle plate 24 arranged as indicated in the drawings. The gases from the pipe 20 are conducted through the tubes 23 of the heat interchanger 21 and a pipe 25 into the gas scrubber 26. The scrubber 26 is provided with a liquid inlet pipe 27, staggered baffle plates 28, a gas outlet pipe 29, and a liquid discharge pipe 30.

The outer casing of the heat interchanger 21 is provided with an ammonia gas inlet pipe 31 which conducts ammonia gas from any suitable source into the heat interchanger 21 wherein it is brought into contact with the exterior of the tubes 23 and is directed in a circuitous path as indicated by the arrow in the drawings by means of the baffle plate 24 and is discharged from the heat interchanger 21 into the pipe 32 which is connected to the gas mixing chamber 18 of the hot gas purifier 19.

Referring to Figure 2 of the drawings, the gas inlet pipe 10 is ordinarily connected to the pipe 33 but in the event that the gas or gases to be treated are not at the desired elevated temperature the connection between the pipe 10 and the pipe 33 is severed as at the point indicated by the dotted line $x'x'$ in the drawings and a preheater corresponding to the preheater 11 in Figure 1 is arranged between and in connection with the pipe 10 and the pipe 33. The gas or gases are conducted from the pipe 33 through the heat interchanger 34, which is similar in construction to the heat interchanger 21 in Figure 1 of the drawings and discharged into the pipe 35 and conducted therethrough to the pump 36. If desired for the purpose of regulating the temperature in the heat interchanger 34, a portion of the gases may be deflected by means of the damper 37 into the pipe 38 and by-passed around the heat interchanger 34 into the pipe 35 as indicated in the drawings. The gas or gases are forced by means of the pump 36 through the pipe 37 into the counter-current scrubber 40 which is provided with a liquid inlet pipe 41, a gas outlet pipe 42, a plurality of staggered baffle plates 43 and a liquid discharge pipe 44. The cooled gases discharged from the countercurrent scrubber 40 are conducted through the pipe 42 and the heat interchanger 34 in a path indicated by the arrow in the drawings and are heated to the desired temperature before being discharged through the pipe 17 into the gas mixing chamber 18 of the hot gas purifier 19.

Optionally, if the gases to be purified are cool, they may be led directly through the pipe 35 into the pump 36 by which they are forced through the scrubber 40 and discharged therefrom through the pipe 42. In this case a preheater similar to the preheater 11 shown in Figure 1, is interposed between the pipe 42 and the pipe 17 in place of the heat interchanger 34.

It will be readily apparent upon reference to the drawings that the hot gas purifier 19, the heat interchanger 21, the scrubber 26, and the connecting, inlet and outlet pipes shown in Figure 2 are identical with the similar features employed in the form of apparatus illustrated in Figure 1 and reference should be had to the description of these features set forth above. In the form of apparatus set forth in Figure 2, however, the liquid discharge pipe 30 from the scrubber 26 is connected to the liquid inlet pipe 41 of the scrubber 40 to supply liquid thereto. The liquid discharge pipe 44 is connected to the circulating pump 45 which is adapted to return the liquid from the bottom of the scrubber 40 through the pipe 46 and the pipe 30 to the inlet pipe 41. The washing liquid is drawn off or purged from the apparatus by means of the discharge pipe 47 and the rate of discharge is controlled or regulated by means of the control valve 48. Ordinarily the amount of discharge from the pipe 47 is approximately equal to the amount of liquid introduced into the scrubber 26 by means of the inlet pipe 27.

As heretofore set forth, our process is particularly adapted for purifying impure commercial hydrogen or mixtures of hydrogen and nitrogen. According to the source of supply and manner of preparation such hydrogen or gas mixture ordinarily contains substantial amounts of carbon monoxid and carbon dioxid, varying small amounts of hydrogen sulphid and other sulfur compounds, phosphorous compounds, arsenic compounds, and various other impurities present in small quantities. Most of these impurities are readily soluble in water or an aqueous ammoniacal solution and may be removed by bringing the hydrogen or gas mixture into intimate contact with such solvents. However, carbon monoxid and certain other impurities cannot be removed in this manner but we have discovered that these impurities can be converted into readily soluble compounds by contacting them with ammonia gas at an elevated temperature in a manner hereinafter described.

In the preferred practice of our process impure commercial hydrogen or a mixture of hydrogen and nitrogen is introduced into the apparatus by means of the supply pipe 10. As heretofore stated, if the hydrogen is not at a sufficiently elevated temperature it is introduced from the pipe 10 through the preheater 11. Thereafter, if necessary, the gases are subjected to a preliminary treatment in a manner hereinafter described to remove carbon dioxid and other impurities which are readily soluble in aqueous ammonia before they are introduced into the hot gas purifier 19. However, if the gases have been subjected to a preliminary treatment to remove these impurities or if such impurities are present only in small amounts the gases are introduced at an elevated temperature into the mixing chamber 18 of the hot gas purifier 19. An excess of ammonia gas from any suitable source, such as an ammonia synthesis plant, is introduced through the pipe 31 into the heat interchanger 21 where the temperature of such ammonia gas is elevated to the desired degree and the ammonia is conducted through the pipe 32 into the mixing chamber 18 where it is intimately mixed with the impure hydrogen introduced thereinto from the pipe 17.

The primary function of the hot gas purifier 19 is to remove the carbon monoxid and certain other impurities from the impure gases by converting the impurities into readily removable compounds such, for example, as formamid which is readily soluble in water. The hot gas purifier 19 is maintained at a temperature of from 0 to 1,000° C., the optimum temperature being approximately 350° C. Within this chamber the carbon monoxid and certain other impurities react with the gases present, particularly the ammonia gas introduced through pipe 32, to form soluble compounds which are later removed. Under certain conditions the carbon monoxid reacts with the ammonia gas to form formamid according to the following equation:

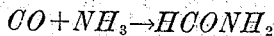
$$CO + NH_3 \rightarrow HCONH_2$$

This reaction is exothermic to the extent of 34,000 calories and is quantitatively complete within the temperature range specified above. A calculation of the free energy equation for this reaction gives an equilibrium constant at constant pressure and 327° C. of $3 \times 10^{-5}$. Thus by Nernst's formula $$\log K_p = \frac{\log{}^p CO \times {}^p NH_3}{{}^p HCONH_2} = -\frac{34,000}{4.58T} + 1.75 \log T + 3.$$

Thus it will be apparent that at the temperature specified the reaction will be practically complete and it will be obvious that such factors as an excess of $NH_3$ will shift the equilibrium farther to the right in the equation given. In practice we have demonstrated that the reaction referred to is complete when dealing with gases containing any reasonably small percentage of carbon monoxid. The foregoing treatment of the mixture of gases to remove even substantial percentages of impurities present by means of gaseous ammonia at elevated temperatures has been found to be extremely satisfactory, there being no detectable traces of such impurities left in the gas mixture after this treatment.

The reaction of carbon monoxid with ammonia in the purifier 19 can be conducted at a higher temperature, for example, at a temperature of from 500 to 700° C., in the presence of copper gauze or filings as a catalyst. At a lower temperature, for example, at a temperature of from 0 to 500° C., iron or metals of the iron-chromium group may be employed as catalysts. In the presence of carbon monoxid we have discovered that these catalysts have little effect upon the ammonia equilibrium. The products formed in the purifier 19 when distilled appear to consist of formamid, hydrocyanic acid or, if the reaction has occurred at the higher temperature range specified above, carbamide, methylamine, and analogous compounds.

From the purifier 19 the hydrogen and the gases formed in the purifier are conducted through the pipe 20 into the heat interchanger 21 where they serve to raise the temperature of the ammonia passing from the pipe 31 through the heat interchanger to the purifier 19. From the heat interchanger 21 the gases are conducted through the pipe 25 into the scrubber 26 where the soluble gaseous compounds formed in the purifier 19 are dissolved by the water introduced through the pipe 27. While water is preferably employed as the gas scrubbing or washing fluid in the scrubber 26 any suitable solvent of formamid and analogous compounds, such as an aqueous ammoniacal solution, a weak acid solution and the like, may be employed in place of water in the scrubber 26. The gases now completely purified except for minor quantities of water vapor, are conducted through the pipe 29 to storage tanks or gas holders or to other apparatus. The liquid from the scrubber 26 is discharged through the pipe 30 and collected if desired or again employed in the further purification of gases.

As heretofore stated, if the gases being treated contain substantial amounts of carbon dioxid and other impurities which are soluble in an aqueous ammoniacal solution, the gases are first passed in the manner heretofore described through the counter-current scrubber 40 where the soluble impurities are removed and discharged through the pipe 47 before the gases are heated and introduced into the hot gas purifier 19. In scrubber 40 the gases are brought into intimate contact with an aqueous ammoniacal solution introduced through the inlet pipe 41 which passes downwardly over the baffle plates 43 through the scrubber 40. The ammoniacal solution introduced into the scrubber 40 is supplied from any suitable source but preferably by means of the pipe 30 from the scrubber 26 and by means of the liquid from the bottom of the scrubber 40 which is withdrawn through the pipe 44 and recirculated when and to the extent desired by means of the pump 45 through the pipe 46 and the pipe 30 to the inlet pipe 41.

As set forth above any suitable washing fluid is employed in the scrubber 26 but water or an aqueous ammoniacal solution is preferably employed. The aqueous ammoniacal solution from the scrubber 26 is, as heretofore stated, preferably employed as the washing fluid in the scrubber 40 and as such washing fluid passes downwardly through the scrubber 40 counter-currentwise to the current of the gases passing upwardly therethrough the soluble impurities are dissolved in the washing fluid and removed from the gases. Since the amount of ammonia employed in the hot gas purifier 19 is substantially in excess of the amount required to react with the impurities present in the gases being treated the liquid discharged from the scrubber 26 and the scrubber 40 will contain in solution a substantial amount of ammonia and ammonia compounds in addition to other impurities removed from the gases being treated; and this liquid which is discharged through the pipe 30 or the pipe 47 may be collected and the compounds dissolved therein recovered and used without purificaton for the producton of fertilizers or commercial grades of ammonium salts, such, for example, as ammonium sulfate or ammonium phosphate.

The partially purified gases are discharged from the scrubber 40 into the pipe 42 through which it is conducted into the heat interchanger 34 where its temperature is raised to the desired degree and are discharged into and conducted through the pipe 17 to the mixing chamber 18 of the hot gas purifier 19 wherein the carbon monoxid and certain other impurities are converted into a readily soluble compound in the manner described.

While the primary function of the hot gas purifier 19 is to convert the carbon monoxid present as an impurity in the gas under treatment into a readily removable compound or compounds various other impurities if present in small amounts are also converted into readily removable compounds by reaction with the gases present or formed in the hot gas purifier 19.

While we prefer to employ our process in connection with the purification of impure hydrogen it will be understood that such process together with the apparatus employed in connection therewith is adapted for the purification of other gases, such for example, as nitrogen and hydrogen-nitrogen mixtures to be employed in the synthetic production of ammonia. Moreover, while we have specified the contacting of the gas or gases to be treated with ammonia at an elevated temperature under certain favorable conditions depending upon the impurities present a certain measure of success can be obtained by contacting the gas or gases to be treated with ammonia in the gas purifier 19 at atmospheric temperatures.

Although we have illustrated the preferred form of apparatus it will be understood that the size, shape, and arrangement of parts may be changed to suit installation conditions and equivalent devices may be employed in place of those illustrated. For example, liquid spray tanks may be substituted for the scrubbers 26 and 40 and any suitable form of preheater may be substituted for the preheater 11; or a different design of heat interchanger substituted for the heat interchangers 21 and 34; or the temperature of the hot gas purifier 19 may be maintained by the application of heat to or within the chamber itself instead of heating the entering gases.

From the foregoing it will be apparent that we have provided a simple, economical and efficient process and apparatus for purifying impure gases or mixtures of gases and that our process and apparatus are particularly adapted for the purification of impure commercial hydrogen for industrial uses.

While we have described in detail the preferred practice of our invention it is to be understood that the form of apparatus shown and described and the details of procedure may be varied without departing from the spirit of the invention or the scope of the subjoined claim.

We claim:

A process for removing impurities including carbon monoxide from hydrogen, nitrogen, or a mixture of hydrogen and nitrogen, which comprises contacting the gaseous material to be purified with ammonia gas at a temperature favorable to the reaction of the ammonia with impurities present to form water soluble reaction products, and contacting the resulting gaseous material with water to remove said water soluble reaction products.

In testimony whereof we affix our signatures.

FRANCIS H. SNYDER.
EDGAR D. NEWKIRK.